Nov. 29, 1966   W. LIMBERGER   3,288,047
APPARATUS FOR EXPOSING AND DEVELOPING SENSITIVE SHEETS
Filed March 29, 1965   8 Sheets-Sheet 1

Walter Limberger
INVENTOR.

BY Karl J. Ross
Attorney

Nov. 29, 1966   W. LIMBERGER   3,288,047
APPARATUS FOR EXPOSING AND DEVELOPING SENSITIVE SHEETS
Filed March 29, 1965   8 Sheets-Sheet 2

Walter Limberger
INVENTOR.

BY
Karl F. Ross
Attorney

Nov. 29, 1966  W. LIMBERGER  3,288,047
APPARATUS FOR EXPOSING AND DEVELOPING SENSITIVE SHEETS
Filed March 29, 1965  8 Sheets-Sheet 4

Walter Limberger
INVENTOR.

BY Karl F. Ross
Attorney

Nov. 29, 1966  W. LIMBERGER  3,288,047
APPARATUS FOR EXPOSING AND DEVELOPING SENSITIVE SHEETS
Filed March 29, 1965  8 Sheets-Sheet 5

Walter Limberger
INVENTOR.

BY
Karl G. Ross
Attorney

Nov. 29, 1966    W. LIMBERGER    3,288,047
APPARATUS FOR EXPOSING AND DEVELOPING SENSITIVE SHEETS
Filed March 29, 1965    8 Sheets-Sheet 6

Fig. 6B

ENERGIZING VOLTAGE

Fig. 6C

Walter Limberger
INVENTOR.

BY Karl F. Ross
Attorney

Nov. 29, 1966 W. LIMBERGER 3,288,047
APPARATUS FOR EXPOSING AND DEVELOPING SENSITIVE SHEETS
Filed March 29, 1965 8 Sheets-Sheet 7

Walter Limberger
INVENTOR.

BY
Attorney

Nov. 29, 1966    W. LIMBERGER    3,288,047
APPARATUS FOR EXPOSING AND DEVELOPING SENSITIVE SHEETS
Filed March 29, 1965    8 Sheets-Sheet 8

Walter Limberger
INVENTOR.

BY Karl J. Ross
Attorney

United States Patent Office 3,288,047
Patented Nov. 29, 1966

3,288,047
APPARATUS FOR EXPOSING AND DEVELOPING SENSITIVE SHEETS
Walter Limberger, Hamburg, Germany, assignor to Lumoprint Zindler K.G., Hamburg, Germany
Filed Mar. 29, 1965. Ser. No. 443,200
3 Claims. (Cl. 95—75)

This application is a continuation-in-part of copending application Ser. No. 717,721, filed jointly by Walter von Kempski and me on Feb. 26, 1958.

In the copending application referred to there has been disclosed a photosensitive sheet material incorporating an emulsion layer of silver halide, a developing and advantageously a fixing agent therefor and a low-melting material, such as a hydrated alkali, designed to activate the aforementioned agents upon the application of heat in order to develop (and, preferably, fix) a latent picture created in the emulsion.

The general object of my present invention is to provide a simple and substantially foolproof apparatus for exposing and developing sheet material of the character set forth.

A more particular object of this invention is to provide means in such an apparatus for automatically subjecting the sheet material to exposure and thermal development in properly timed relationship.

An apparatus according to this invention comprises, basically, an exposure device including an illuminating light source, a source of heat and means for sequentially subjecting a photosensitive and thermally developable sheet material to the action of the exposure device and the heat source. An original or master to be reproduced may be held in contact with the copy sheet during exposure, or may be illuminated by the light source for the projection of its contents upon the copy sheet through a suitable lens system or the like. The timing of the exposure may be determined by the duration of the operating interval of the light source or by a conventional shutter associated with the optical projection system. In either case, the exposed copy sheet is heated for a predetermined length of time and at a suitably selected temperature immediately after the exposure.

The heating of the exposed copy sheet may be brought about by external means, such as a resistance element or an emitter of infrared radiation, or by the passage of a heating current through the sheet itself which for this purpose has to have a certain conductivity, be it by virtue of an admixture of carbon and/or metal particles, or be it on account of a conductive coating applied thereto. In accordance with a specific feature of my invention, the heating means may include one or more transport rollers for the sheet material which may be either directly heated or connected in a circuit to serve as electrodes for the passage of a heating current through the sheet.

The principles of my invention may also be utilized in a system wherein the original and the photosensitive sheet are concurrently moved past respective slits so that only a narrow portion of the copy sheet, corresponding to a similar strip of the original, is exposed at any one time. In this case the exposure continues progressively as the copy sheet and the original move past their respective slits until the original has been fully scanned; there is, however, no need for delaying the thermal development of the copy sheet until the entire exposure has been completed, hence the exposed portions of that sheet may be progressively developed as they come from the exposure station. In this case, too, use of heated feed rollers or rollers serving as electrodes for the passage of a heating current will be convenient.

The above and other features of my invention will become more clearly apparent from the following detailed description of certain embodiments, reference being made to the accompanying drawing in which.

Throughout the drawing, similar or analogous elements have been designated by corresponding reference numerals varying only in the hundreds digits, the latter conforming to the designation of the respective view.

Figure 1:
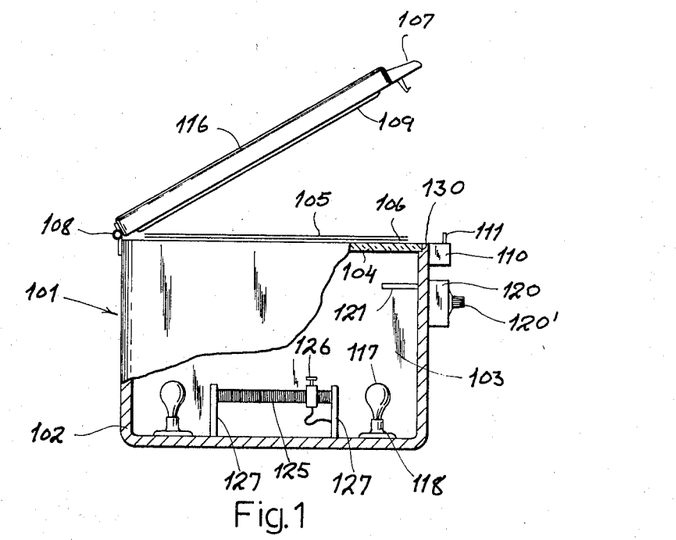
FIG. 1 is a side-elevational view, partly in section, of an apparatus embodying the invention.

In FIG. 1 I show a device 101 similar to a conventional contact printer used in photocopying. This device comprises a housing 102 defining a chamber 103 in which are disposed the elements necessary to furnish light and heat for the exposure and subsequent development of a latent image upon a photosensitive material. Exposure lamps 117 are secured within electrical sockets 118 and provide an even illumination of a transparent glass plate 104 and of an original or master sheet placed thereon. This original 105 (e.g. a drawing, photograph or letter) is placed face down on the emulsion side of a substantially coextensive sheet of photosensitive paper 106 and then the two sheets are securely superposed and pressed together onto the plate 104 by lowering a cover 116 with a handle 107, this cover being swingable on a hinge 108 fastened to the housing 102. An even pressure is maintained upon the receiving and master sheets 105, 106 by a yieldable platen 109 of heat-resistant resilient material, substantially coextensive with the inner surface of the cover 116 in direct contact with the sheet 105.

In the operation of the device 101, an exposure interval is selectable with the aid of a timer 120 by setting an adjustable control 120' for the timer to a desired lighting period of the lamp 117. When the cover 116 is lowered to a plane substantially parallel with the plate 104, the handle 107 is latched onto a retainer 110 secured to the housing 102; this retainer 110 includes a switch 111 which is actuatable by the lowered handle 107. Lowering of the cover 116 closes the switch 111 and energizes the lamps 117 for the period preselected by the timer 120. Upon the termination of the illumination period, the lamps are extinguished and a heater 125, supported within the chamber 103 by standoff insulators 127, is furnished with electrical energy by the timer 120. The infrared radiant energy of the heater 125 is monitored by a thermostat 121 projecting into the chamber 103 a short distance below the plate 104. This radiant energy from heater 125 impinges upon the temperature-sensitive layer of the receiving sheet 106 and causes the release of water from a thermally deliquescent substance contained therein. The resulting solution and diffusion of active materials in the sheet 106 leads to a development of the latent image present on the paper 106. Since the emulsion side of paper 106 contacts the original 105 during exposure, the developed image will be a reproduction of the contents of sheet 105 in a 1:1 image ratio.

The thermostatically controlled heat energy is allowed to impinge upon the paper 106 for a time determined by the setting of the timer 120. This can be accomplished with the knob 120' or by a different control not shown. The heater coil 125 carries a slidable shorting band 126 which may be slid therealong to adjust the resistance of element 125 and, thereby, the overall heat energy produced during an operating cycle of the timer. Access to the chamber 103 for such adjustment, and for lamp replacement and other maintenance purposes, is obtained simply by lifting the glass plate 104 out of a recess 130 in the housing 102.

At the end of the heating and developing period, the timer 120 interrupts the flow of current to the heater 125 and indicates the completion of the copying operation by a visual and/or audible signal, e.g. as described hereinafter with reference to FIG. 3A. The cover 116 is then unlatched and raised, and the sheets 105, 106 are removed from the plate 104.

Figure 2:
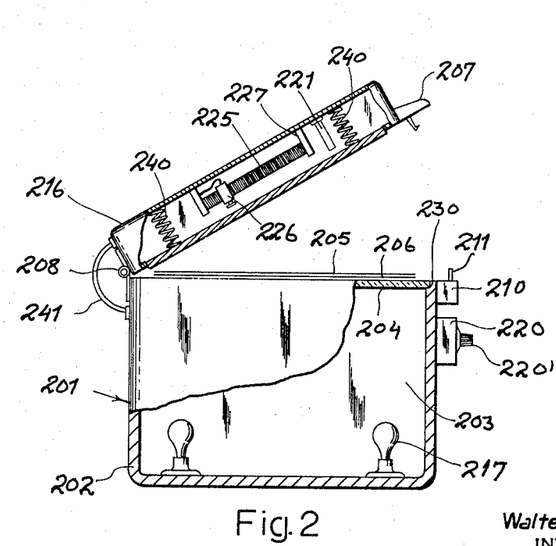
FIG. 2 is a view similar to FIG. 1, illustrating a modification.

In FIG. 2 I show a device 201 generally similar to the apparatus 101 just described but with a different location for its heater 225 and thermostat 221. These elements are now disposed within the cover 216 and are connected electrically by a lead 241 to the timer 220. When the lid 216 is lowered upon the original 205 and the photosensitive sheet 206, an electrical circuit is closed through switch 211 substantially as described for the device 101 of FIG. 1. However, in the modification of FIG. 2 a thermoconductive platen 209 (e.g. of aluminum or other material of high heat conductivity) forms the underside of the cover 216 and is biased outwardly by expansion springs 240 in its interior. The platen 209 provides pressure to assure intimate contact between the original 205 and the receiving sheet 206 when these sheets are held between the platen 209 and the glass plate 204 upon a lowering of the lid 216. In addition, the high thermal conductivity of platen 209 facilitates the flow of heat energy therethrough from the heater 225 to the temperature-sensitive layer of copy sheet 206. This heat energy again effects liquefaction and diffusion of a low-melting or deliquescent substance within the sheet 106 and the subsequent development of the latent image created by the preceding exposure.

Figure 3:
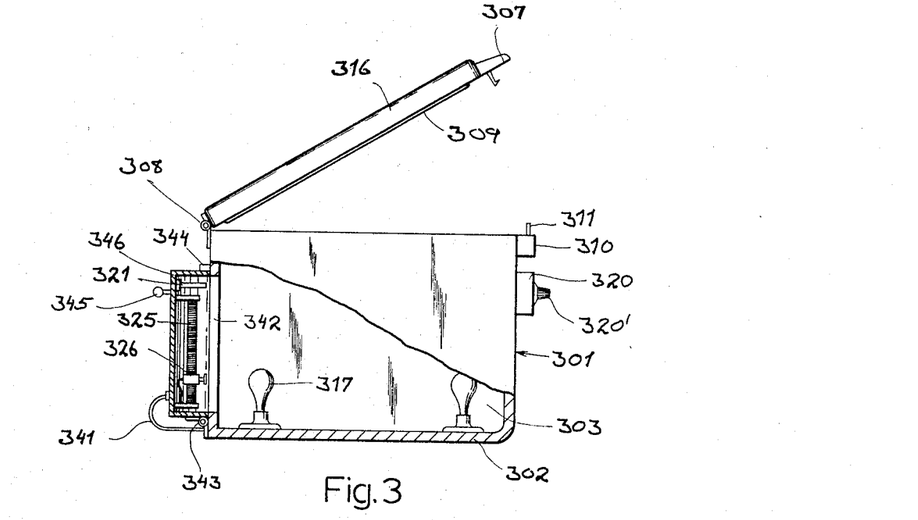
FIG. 3 is another view similar to FIG. 1, showing a further modification.

In FIG. 3 I show a device 301 whose source of thermal energy is a heating element 325 disposed along a side of the housing 302 having an aperture 342 for the passage of heat into the chamber 303. The heating element 325 and the thermostat 321 are housed within a dished reflector 346 pivotable upon a hinge 343 so that it may be swung laterally outwardly to give access to its slider 326. The reflector 346 is normally held in a closed position by a latch 344 from which it may be swung away by the knob 345. A cable 341 forms part of an emergency circuit for the thermostat 321 and the heater 325. The operation of apparatus 301 is substantially similar to that of the devices 101 and 201 described above.

Figure 3A:
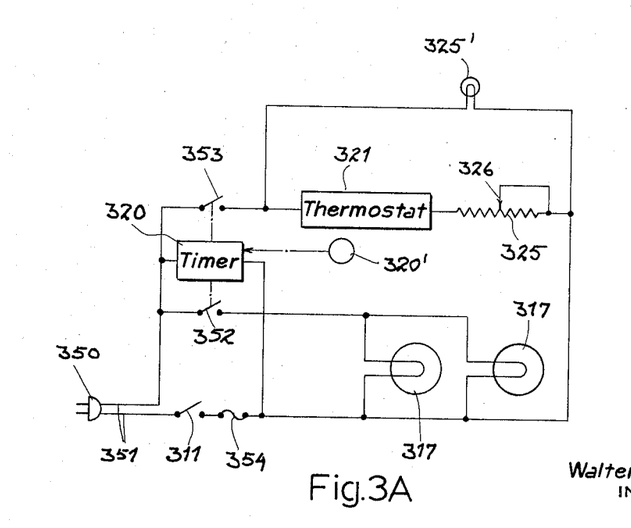
FIG. 3A is a circuit diagram relating to the embodiment of FIG. 3.

In the diagram of FIG. 3A, applicable specifically to the device 301 but also representative of the operation of devices 101 and 102, an electrical connector 350 transmits power from an outlet (not shown) to the device by a line cord 351. A fuse 354 in series with switch 311 protects the electrical circuits in a conventional manner. The switch 311 is closed when the cover 316 is lowered preparatorily to making a reproduction. A heater switch 353 and an illumination switch 352 are sequentially actuated by the timer 320, which is bridged across the input line 351 for initiation of its operating cycle by the switch 311. Switch 352 is held closed by the timer 320 for a duration corresponding to the exposure time selected by adjustment of knob 320', thus energizing the lamps 317. Thereafter, timer 320 opens switch 352, the lamps 317 are extinguished, and the heating stage of the cycle commences with the closure of switch 353 in series with heating element 325 and thermostat 321. Following a predetermined heating period, established by timer 320, switch 353 is opened and the copy and master sheets can be removed from the device. The duration of the heating period can be monitored by the lighting of a signal lamp 325' connected across thermostat 321 and resistance element 325. It will be understood that the thermostat 321 and the slider 326 control, respectively, the maximum heating temperature and the rapidity with which this temperature is reached after the start of the heating cycle.

Figure 4:
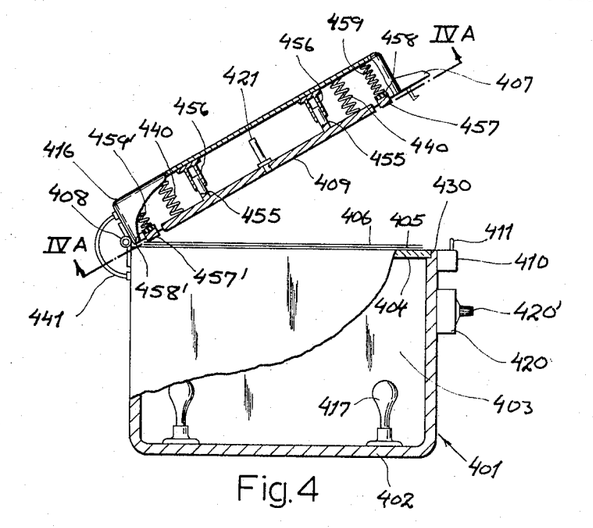
FIG. 4 is another side-elevational view, partly in section, representing an alternate embodiment.
Figure 4A:
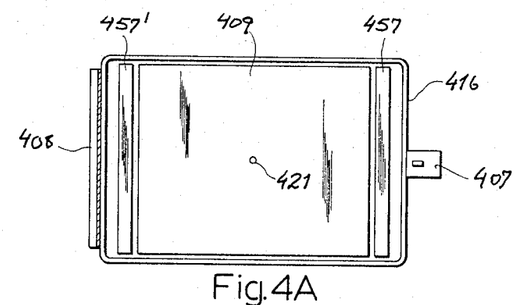
FIG. 4A is a bottom view of the cover of the device of FIG. 4, taken on the line IVA—IVA of FIG. 4.
Figure 4B:
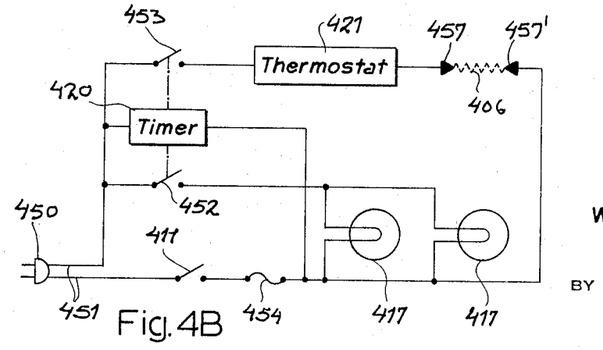
FIG. 4B is a circuit diagram relating to the device of FIGS. 4 and 4A.

In FIGS. 4, 4A and 4B I show an embodiment of the present invention which depends for its operation upon the presence of an electrically conductive material in one of the sheets received therein, specifically the copy sheet 406. This material may consist of metallic fibers and/or metal or carbon particles imbedded within the base to facilitate current flow therethrough. In lieu of or in addition to such imbedded substances, the sheet may also have a conductive coating of suitable electric resistance on the side opposite its photosensitive emulsion.

The apparatus 401 of FIGS. 4 and 4A, designed for the translumination of the master sheet 405, comprises a housing 402 with a hinged cover 416 which is lowered upon the original 405 and the copy sheet 406 juxtaposed therewith. The cover 416 has an electrically nonconductive platen 409 which is urged outwardly of the cover by springs 440 and is guided for movement relative to the cover by studs 455 sliding in sockets 456. Flanking the platen 409 at its ends are a pair of highly conductive metal bars 457, 457' which are supported by insulating layers 458, 458' and urged outwardly of the cover 416 by springs 459, 459'; guide means for the bars 457 and 457', similar to those shown at 455, 456 for the platen 409, have not been illustrated.

As shown in FIG. 4B, the bars 457, 457' are connected across a current source (represented by a plug 450) through a thermostat 421 and switches 411, 453. The resistance of the sheet 406 has been indicated diagrammatically in FIG. 4B. Exposure of the sheets takes place in the manner described previously, temporary closure of contacts 452 by timer 420 causing lamps 417 to light for a predetermined period whereupon contacts 453 are closed to energize the bars 457, 457'. The thermostat 421, bearing against the surface of the sensitive paper 406 to monitor the temperature thereof, penetrates the center of the platen 409 (see FIGS. 4 and 4A).

Figure 5:
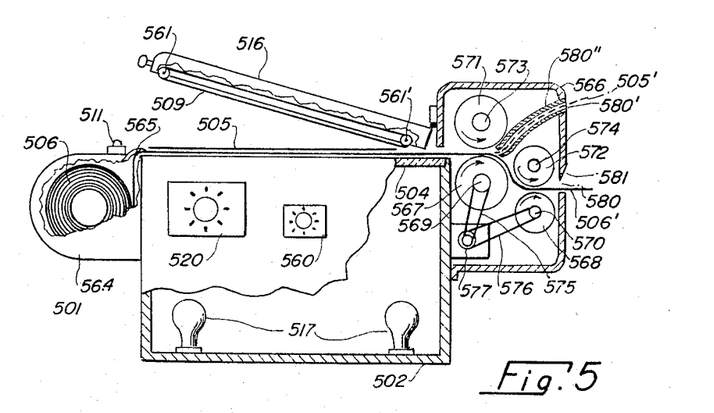
FIG. 5 is again a view similar to FIG. 1, showing still another modification.

The device 501 shown in FIG. 5 has its housing 502 externally equipped with a lightproof cassette 564 containing a roll of copy material 506. From cassette 564 the web 506 passes under a lighttight lip 565 of flexible material (e.g., rubber) onto the surface of the carrier plate 504 of glass or other transparent material. An original 505 to be copied is placed atop the web 506 and the cover 516 is then lowered to press the two layers 505, 506 together. Swich 511 is thereby actuated to start the timer 520 for initiating the operating sequence with lighting of lamps 517 in housing 502.

A subhousing 566 attached to main housing 502 encloses the transport and heating components of this embodiment of my invention. Two feed rollers 567, 568 are carried on respective shafts 569, 570. Two feed rollers 571, 572 on respective shafts 573, 574 help transport the web 506 by bearing against the rollers 567, 568. Feed rollers 567, 568 are driven by respective transmission belt 575, 576 and electric motor 577. The rollers 567, 568, are electrically conductive and are journaled in nonconductive bearings (e.g. of Teflon or nylon) to prevent grounding of these rollers which serve as electrodes for supplying current to the electrically conductive sheet material 506 for thermal development thereof, via circuits to be described with reference to the diagram of FIG. 5A.

After the lighting and extinction of the lamps 517, timer 520 starts the motor 577 to advance the sensitive web 506 through the device of the predetermined distance sufficient to eject the exposed web portion from housing 502. During the transport of the web 506 past rollers 567 and 568, the current passing therethrough heats the exposed portion of the web to the necessary activation temperature, the finished copy issuing from a slot 580 in the subhousing 566 while the original, as indicated at 505', exists through another slot 580' to which it was directed by guide members 580''. The slot 580 is bounded at the top by a serrated edge 581; the emerging terminal portion 506', bearing the developed print of master 505', is severed from its web 506 by upward deflection and tearing against the edge 581.

The cover 516 contains an endless band 509 looped around rollers 561, 561', the lower reach of this band bearing continuously upon original 505 and web 506 during exposure and development. Rollers 561, 561' can be driven, if desired, in synchronism with rollers 567, 568, 571, 572 to insure the concurrent passage of the original 505 and the web 506.

Figure 5A:
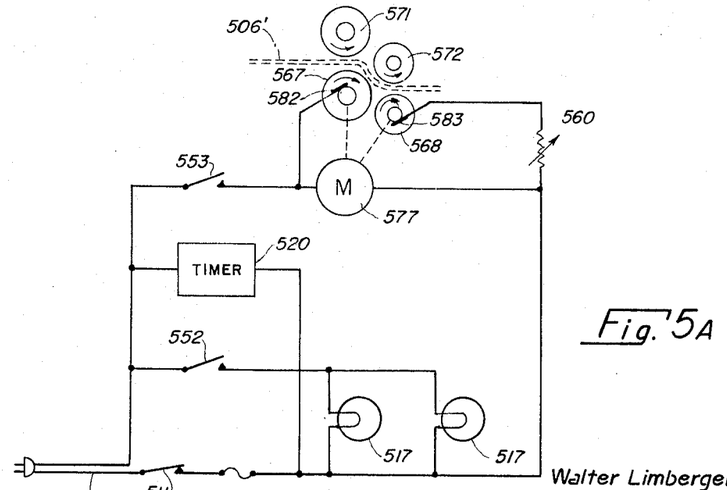
FIG. 5A is a circuit diagram relating to the embodiment of FIG. 5.

The diagram of FIG. 5A illustrates how the motor 577 is energizable upon closure of a timer-controlled switch 553 connected to the input line 551. A rheostat 560, also illustrated in FIG. 5, determines the current passing through rollers 567, 568 and sheet 506 to control the amount of heat developed in the copy material. The rollers 567, 568 are energized via sliders 582, 583, respectively. Another timer-controlled switch 522 lights the lamps 517 before the motor 577 is operated.

Figure 6:
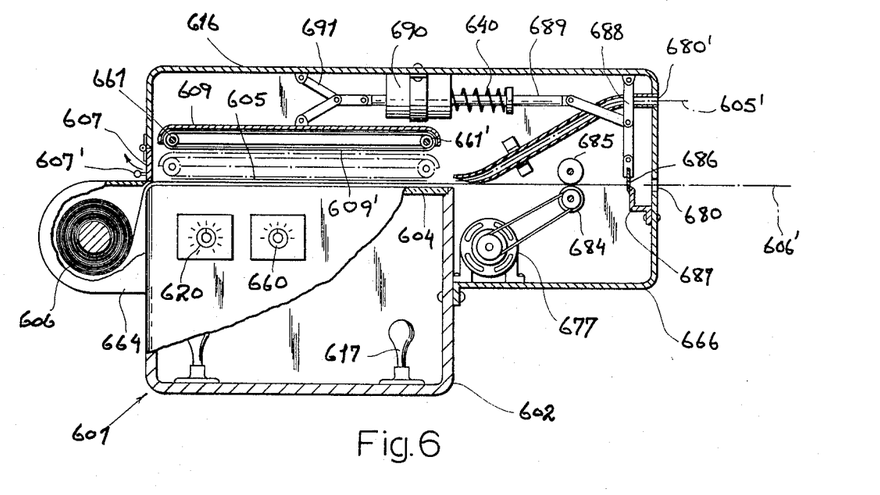
FIG. 6 is a sectional elevational view, partly in side elevation, of yet a further embodiment.
Figure 6A:
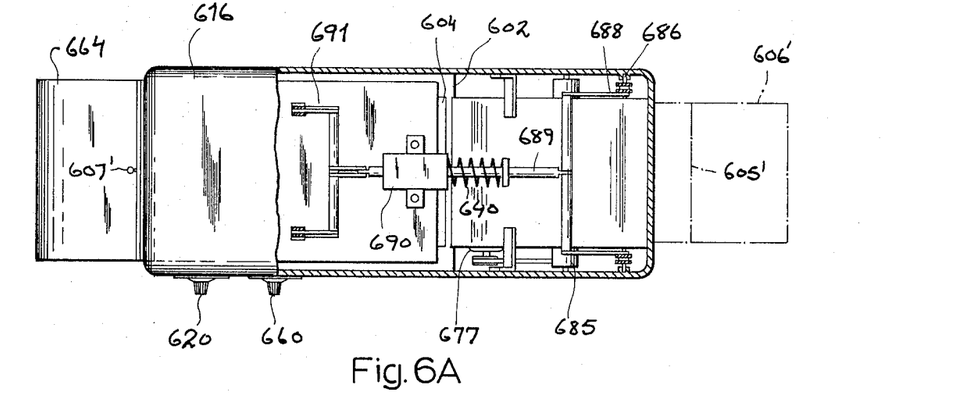
FIG. 6A is a top view (partly broken up) of the apparatus of FIG. 6.

The apparatus 601 shown in FIGS. 6, 6A also operates with a continuous web 606 drawn from a roll in a cassette 664 attached to housing 602. The web 606 is drawn across a transparent plate 604, as in the preceding embodiment, by a pair of feed rollers 684, 685 of which at least the lower roller 684 is positively driven by a motor 677. The cover 616 of housing 602 is integral with housing extension 666 which contains the transport means 677, 684, 685 as well as a mechanism for severing an exposed and developed portion 606' of web 606 from the remainder of the web; this mechanism includes a guillotine-type cutter blade 686 co-operating with a stationary knife edge 687. Blade 686 is suspended from a toggle linkage 688 which in turn is articulated to a rod 689 whose central portion constitutes the core of a solenoid 690. The opposite end of rod 689 is articulated to another toggle linkage 691 under pressure from a spring 640 which tends to shift the rod to the right as viewed in FIG. 6. A platen 609, which may be guided for vertical movement by means not further illustrated in FIG. 6 but similar to the elements 455, 456 of FIG. 4, is hinged to the linkage 691 so as to be normally held in a raised position by the spring 640; this platen includes an endless band 609', similar to that shown at 509 in FIG. 5, led around rollers 661 and 661'. A hinged lid 607 with handle 607' gives access to the interior of cover 616 when it is desired to insert an original between the web 606 and the raised platen 609 or to remove the original after exposure; lid 607, when closed, prevents illumination of the sensitive layer of web 606 by ambient light. Housing extension 666 also has an ejection slot 580 for the severed web portion 606' and another such slot 680' for the original 605' used in the previous exposure.

Figure 6B:
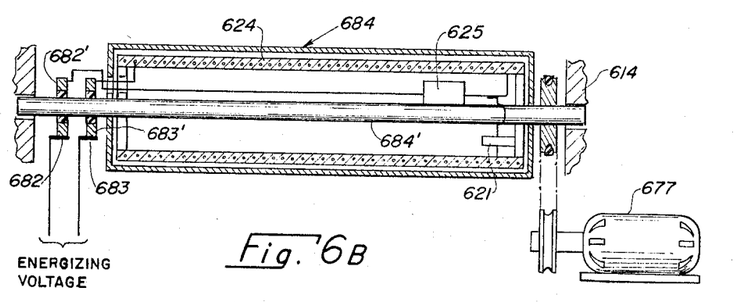
FIG. 6B is an enlarged sectional view of a feed roller forming part of the device of FIG. 6.
Figure 6C:
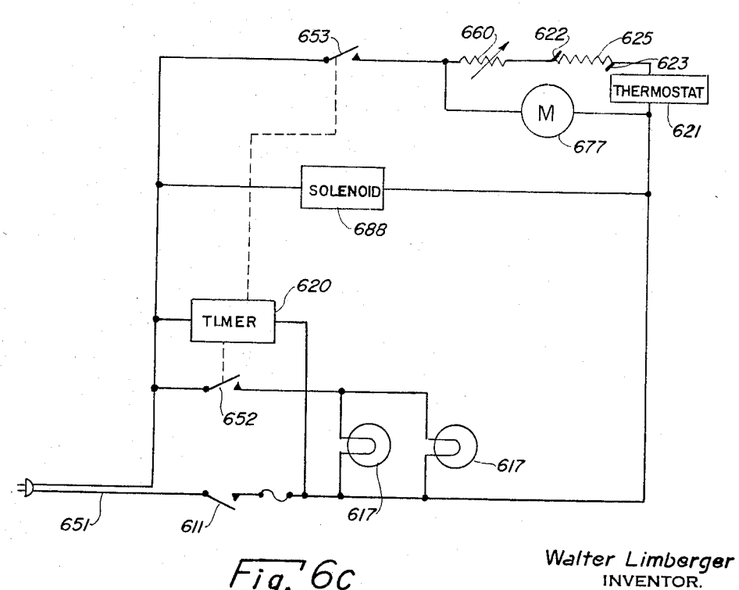
FIG. 6C is a circuit diagram relating to the apparatus of FIGS. 6, 6A and 6B.

As shown in FIG. 6B, the roller 684 encompasses a heating member 624 in the form of a thermally and electrically conductive sleeve having a resistance element 625 disposed therein; element 625 is energized via sliding contacts 682, 683 and slip rings 682', 683' on the shaft 684' of the roller. As illustrated in the circuit diagram of FIG. 6C, motor 677 and heating element 625 are energized simultaneously from line 651 by the closure of a contact 653 by the timer 620 after the latter has temporarily closed and reopened a contact 652 to energize the lamps 617; a manually operated switch 611 concurrently actuates the timer 620 and the solenoid 688, the latter thereupon shifting the rod 689 to the left (FIG. 6) to lower the platen 609 upon the sheets 605, 606 and to raise the cutter blade 686 out of the path of web 606. Rheostat 660 and thermostat 621 are connected in series with resistance element 625; the latter in this instance is, of course, representative of any convenient means for heating the interior of feed roller 684.

Figure 7:
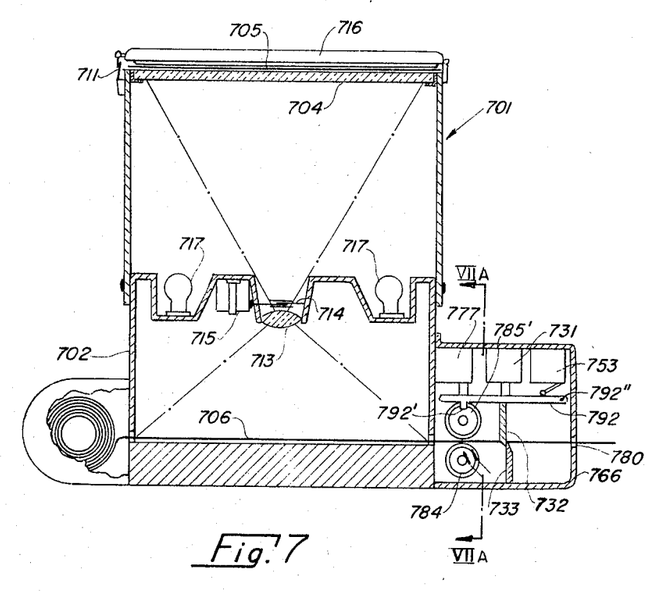
FIG. 7 shows, in sectional elevation, a further embodiment of my invention.
Figure 7A:
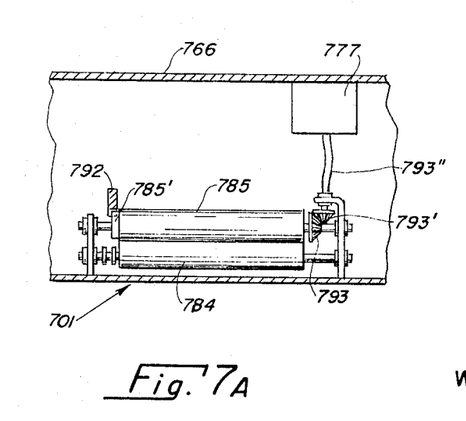
FIG. 7A is a cross-sectional view taken on the line VIIA—VIIA of FIG. 7.
Figure 7B:
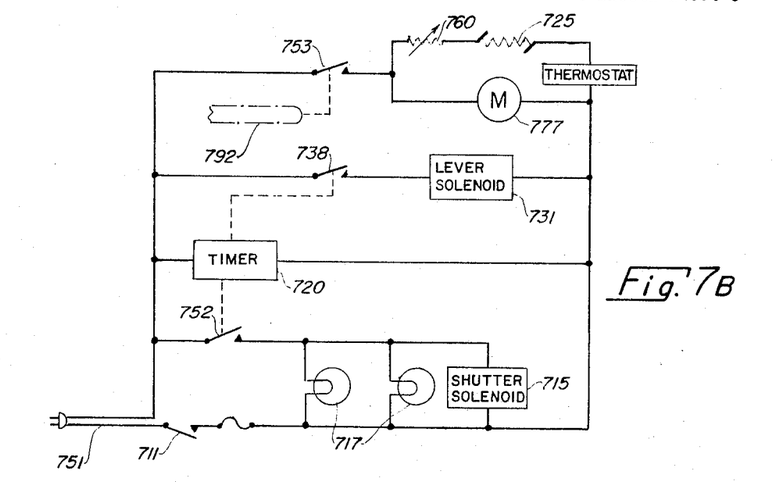
FIG. 7B is a circuit diagram pertaining to the system of FIGS. 7 and 7A.

The apparatus 701 of FIGS. 7 and 7A has a light-tight housing 702 with slots for the entrance and exit of a web 706 of photosensitive material, the top of the housing 702 being formed by a transparent plate 704 overlain by a hinged cover 716. As before, cover 716 upon its closure actuates a switch 711 to start the timing mechanism within the housing. A master or original sheet 705, sandwiched between plate 704 and cover 716, is illuminated by lamps 717 whose light rays, after reflection at the underside of sheet 705, are focused by an objective 713 (here shown diagrammatically as a lens) upon the upper surface of sheet 706. A shutter 714, operable by a solenoid 715, as disposed adjacent lens 713. Housing extension 766 includes a pair of feed rollers 784, 785 of which the lower one, i.e. roller 784, may be constructed in essentially the same manner as roller 684 of FIGS. 6 and 6A. Upper roller 785 is rigid with a notched disk 785' whose peripheral indentation is normally engaged by a tooth 792' on a lever 792. The shaft of roller 785 is also rigid with a bevel gear 793 in mesh with a bevel gear 793' on a flexible shaft 793'' driven by a motor 777. Lever 792 is controlled by a solenoid 731 and bears upon a switch 753 in series with heating element 725 (FIG. 7B) of roller 784; element 725, in series with a rheostat 760 and a thermostat 721, is again connected in parallel with motor 777 for concurrent energization. A contact 752, controlled by timer 720, energizes the lamps 717 and the shutter solenoid 715 which may operate with a slight delay and which, in this case, determines the length of exposure; another timer-controlled switch contact 738, when closed, connects the lever solenoid 777 across the line 751. Lever 792 also carries a cutter blade 732 co-operating with a stationary blade 733 within housing extension 766.

In the operation of the apparatus 701, closure of cover 716 actuates the switch 711 to start the timer 720 whereupon the lamps 717 light and the shutter 714 is opened for a predetermined length of time to expose the portion of web 706 extending within housing 702. Upon the extinction of lamps 717, motor 777 and solenoid 731 are energized whereby lever 792 is swung clockwise (as viewed in FIG. 7) about its fulcrum 792'' to raise the blade 732 out of the path of web 706 and to withdraw the tooth 792' from the notch of disk 785'. The torque of motor 777 is transmitted through flexible shaft 793'' and gears 793, 793' to roller 785, its companion roller 784 being concurrently heated by element 725 so that the exposed portion of sheet 706 is drawn out between these rollers and thermally developed just before being discharged from the exit slot 780 of housing extension 766. When the timer 720 subsequently releases the solenoid 731, lever 792 returns to normal (under its own weight and/or through the action of a biasing spring not shown) and re-engages the notch of disk 792' to arrest the roller 785. Motor 777 and heater 725 are deactivated at the same time and blade 732 descends to cut off the exposed and developed sheet portion.

Figure 8:
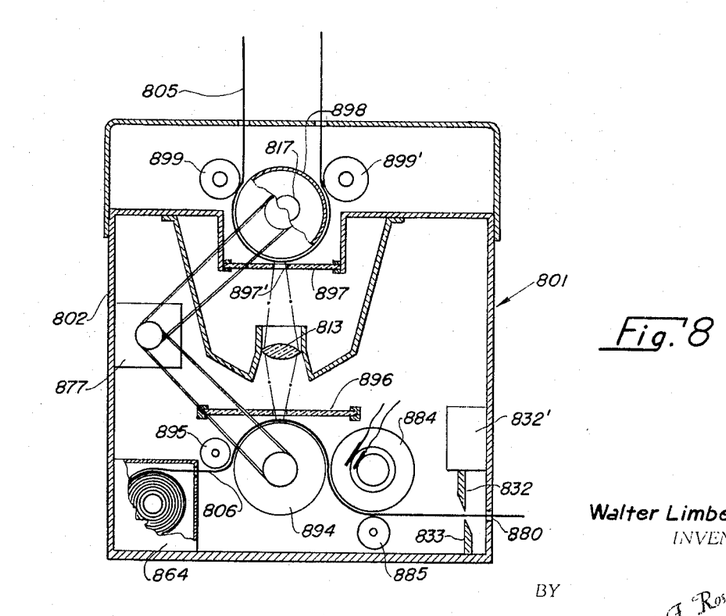
FIG. 8 is still another sectional elevation illustrating a final embodiment.

The apparatus 801 of FIG. 8 inclues a lighttight housing 802 with a storage chamber 864 for a roll of photosensitive shett material 806 which passes around a set of rollers including an exposure roller 894, a pressure roller 895, a heating roller 884 and a coacting roller 885. A motor 877 drives the roller 894 and, separately or through the latter, the remaining rollers to advance the web 86 continuously past an opaque platform 896 provided with a transparent slit 896'. A similar platform 897, having a transparent slit 897', is disposed adjacent a transparent drum 898 also driven from motor 877. A pair of pressure rollers 899 and 899' urge an original 805 against the periphery of roller 898, on which it moves past the slit 897' in step with the movement of web 806 past the slit 896'. A cutter blade 832, controlled by a solenoid 832', coacts with a stationary counter blade 833 adjacent the outlet slot 880 of housing 802.

In the operation of this embodiment, a lamp 817 inside cylinder 898 is turned on concurrently with motor 877 for continuous translumination of successive portions of sheet 805 registering with slit 987', the images of these portions being projected by a lens 813 through slit 896' upon corresponding portions of web 806. Roller 884, heated electrically in the same manner as rollers 684 and 784 of the two preceding embodiments, causes the exposed sheet portions to be thermally developed before they pass out of the slot 880. Cutter solenoid 832' may be operated manually whenever it is desired to sever a developed sheet portion from the remainder of the web 806.

It is to be understood that compatible features from different embodiments may be combined so that, for example, the roller electrodes 567, 568 of FIGS. 5 and 5A could be substituted for the directly heated roller 784 of FIG. 7 if the web 706 is suitably conductive. The timer 120 etc. shown in the several embodiments, illustrated only schematically, are representative of a variety of conventional electrical or electromechanical devices including, for example, separate clocks for the exposure cycle and the heating cycle coupled for staggered operation as disclosed in the copending application Ser. No. 717,721. These and other modifications, readily apparent to persons skilled in the art, are deemed to be embraced in the spirit and scope of my invention as defined in the appended claims.

I claim:

1. An apparatus for copying the contents of an original onto an electrically conductive photosensitive sheet incorporating a thermally activable developing agent for a latent image, comprising support means for said photosensitive sheet, exposure means including a source of light rays trained upon an original to be copied for creating a corresponding latent image on said photosensitive sheet, timing means for measuring a predetermined operating interval for said exposure means, and heating means operable by said timing means at the end of said interval for subjecting said photosensitive sheet for a predetermined length of time to a temperature sufficient to develop said latent image, said heating means including contact means engageable with said sheet and circuit means for passing a heating current through said sheet by way of said contact means.

2. An apparatus for copying the contents of an original onto an electrically conductive photosensitive sheet incorporating a thermally activable developing agent for a latent image, comprising a housing, support means for said photosensitive sheet in said housing, means in said housing including a source of light rays trained upon an original to be copied for creating a corresponding latent image on said photosensitive sheet, timing means for measuring a predetermined operating interval for said exposure means, transport means for discharging the exposed sheet from said housing, and heating means including said transport means operable by said timing means at the end of said interval for subjecting said photosensitive sheet for a predetermined length of time to a temperature sufficient to develop said latent image, said heating means including a pair of electrode elements spaced apart in the direction of travel of said exposed sheet for successive contact therewith and circuit means including said electrode elements for passing a heating current through said exposed sheet.

3. An apparatus as defined in claim 2 wherein said transport means includes two pairs of feed rollers positioned successively to contact said exposed sheet, said electrode elements including one roller of each pair.

References Cited by the Examiner

UNITED STATES PATENTS

| | | | |
|---|---|---|---|
| 1,261,177 | 4/1918 | Strong | 95—73 |
| 1,755,487 | 4/1930 | Owens | 88—24 |
| 2,127,601 | 8/1938 | Jaffe | 95—73 |
| 2,317,655 | 4/1943 | Van Den Broek. | |
| 2,674,933 | 4/1954 | Wigglesworth | 95—73 |
| 2,918,857 | 12/1959 | Frantz | 95—77.5 |
| 2,983,210 | 5/1961 | Baril et al. | 95—77.5 |
| 2,984,163 | 5/1961 | Giaimo | 95—1.7 |
| 3,022,716 | 2/1962 | Smith et al. | 95—77.5 |

FOREIGN PATENTS

| | | |
|---|---|---|
| 1,003,578 | 2/1957 | Germany. |

JULIA E. COINER, *Primary Examiner.*

EVON C. BLUNK, *Examiner.*